Nov. 10, 1936.   C. H. H. RODANET   2,060,531
CLOCK PROVIDED WITH A TRANSPARENT DIAL AND AN INVISIBLE MECHANISM
Filed Jan. 23, 1935   2 Sheets-Sheet 1
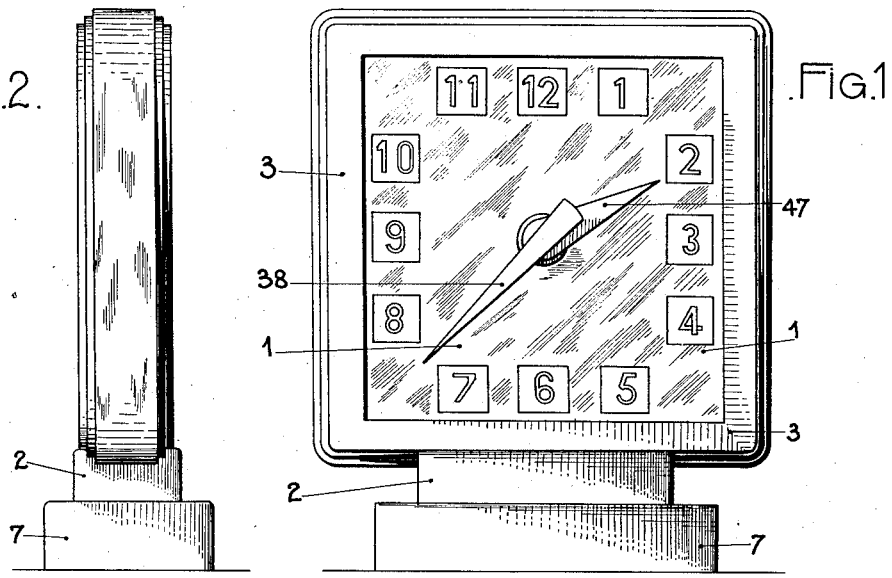
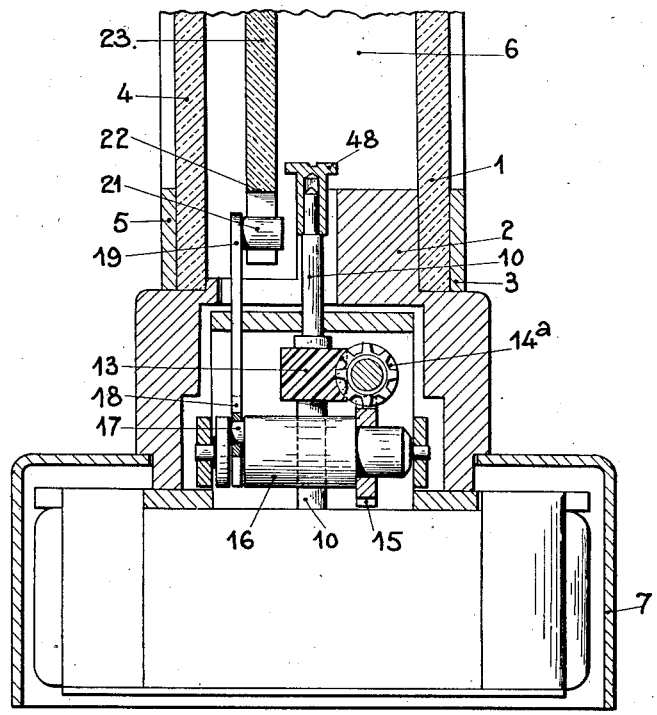
C. H. Rodanet
Inventor
By: Glascock Downing & Seebold
Attys.

Nov. 10, 1936.   C. H. H. RODANET   2,060,531
CLOCK PROVIDED WITH A TRANSPARENT DIAL AND AN INVISIBLE MECHANISM
Filed Jan. 23, 1935   2 Sheets-Sheet 2

Patented Nov. 10, 1936

2,060,531

UNITED STATES PATENT OFFICE 2,060,531

CLOCK PROVIDED WITH A TRANSPARENT DIAL AND AN INVISIBLE MECHANISM

Charles Hilaire Henri Rodanet, Neuilly-sur-Seine, France, assignor to Société Anonyme: Etablissements Ed. Jaeger, Levallois-Perret, France Application January 23, 1935, Serial No. 3,153
In France February 26, 1934

3 Claims. (Cl. 58—45)

This invention relates to clocks having three transparent plates, one of which, located at the front, forms the dial, whilst that located at the rear, receives a mechanism for supporting and actuating the hands of the clock, which mechanism is actuated by the intermediate transparent plate receiving a reciprocating movement from a motor rotating in a constant direction. This motor might be a synchronous electric motor, as already proposed in other types of clocks. Such synchronous motors are provided, in general, with means allowing them to start automatically when, after accidental interruption, the supply current is re-established. But when not self-starting it is necessary to provide the motor with a special device for forcing it to start in the suitable direction as, in already known applications of these motors, the hands of the clock are driven by gears, and they would rotate in the wrong direction if the motor did not start in the proper direction. The same device should be employed if use was made of a synchronous motor for actuating the clock already known provided with three transparent plates; in fact, in this clock, the kinematic connection between the motor and the intermediate oscillating plate is obtained by teeth of the ratchet cooperating with a movable pawl for causing the latter to rock, so that the system operates only if the motor rotates in the suitable direction.

The invention allows of simplifying the synchronous motor by avoiding the use of a device causing it to start in a definite direction. For that purpose, it is characterized by the fact that the synchronous motor is connected to the intermediate oscillating plate through the medium of a crank device the operation of which is independent of the direction of rotation of the motor.

The accompanying drawings illustrate, by way of example only, a form of carrying the invention into practice.

Fig. 1 is a front view of the clock.

Fig. 2 is a side view thereof.

Fig. 4 is a sectional side view made according to line A—A of Fig. 3.

Figure 3:
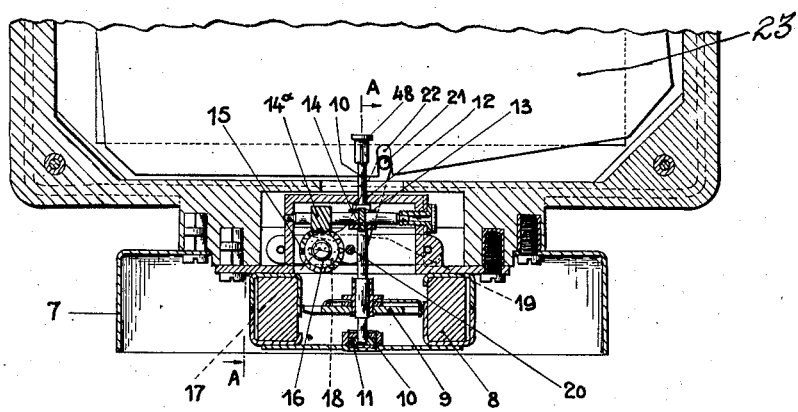
Fig. 3 is a partial sectional elevation, on an enlarged scale, of the lower part.
Figure 5:
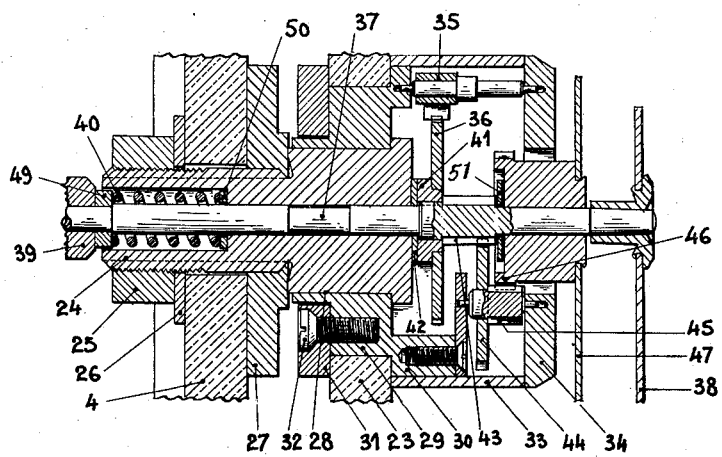
Fig. 5 is a sectional side view of the central system.

The front transparent face 1, which carries the dial, is mounted on a framework 2, where it is secured by means of the frame 3. Likewise, the rear transparent face 4 is secured on the framework 3 by means of the frame 5. A free central and completely closed space 6 is therefore provided between the faces 1 and 4.

The framework 2 is secured on a hollow base 7, within which is arranged the stator 8 of the motor. The rotor 9 is mounted on a vertical arbor 10, which is supported at 11, at its lower part, and at 12 at its upper part.

Through the wheels 13, 14, 14a and 15, the rotor causes the arbor 16 to rotate, this arbor carrying, at 17, an eccentric trunnion extending in the fork 18 of a bell crank 19 pivoted at 20. It will be seen that the rotation of the motor causes the bell crank to rock, the end of this bent lever engaging, through the medium of a finger 21, with a notch 22 provided at the base of a transparent plate 23 supported as stated hereinafter.

At the center of the rear transparent wall 4, a support 24 is secured by means of a nut 25, with interposition of washers 26 and 27. The support 24 is turned at 28 for forming a journal for a bush 29 on which the transparent plate 23 is secured. The latter is clamped between the flange 30 of the bush 29 and a washer 31, secured for instance by means of screws 32.

The bush 29 is covered by a case 33 closed by a cover 34, in order to constitute a rocking drum within which is pivoted a pawl 35, restored by its own weight. This pawl engages with a wheel 36 secured on the arbor 37 which is that of the minute hand 38. This arbor 37 extends outwardly and terminates in a knob 39 which is used for setting the clock right, and on which acts a spring 40 mounted on the arbor between washers 49 and 50. The spring is adapted to press the hub 41 of the wheel 36 against the fixed support 24, through the medium of a friction washer 42, for holding the wheel 36 stationary during the idle stroke of the pawl. Instead of this friction washer, use might be made of a stop pawl.

The arbor 37 drives, through the wheels 43—44—45 and 46, the hour hand 47, mounted in the well-known manner, a washer 51 being inserted between wheels 43 and 46. On the other hand, the arbor 10 extends above the framework 2 and terminates in a small disc 48 which allows, owing to its rocking movement, to see at a glance whether the clock is working or not.

The oscillation of the transparent plate 23 causes the wheel 36 to move forward to the extent of one tooth at every complete oscillation. The advance movement of the minute hand is therefore discontinuous, this having no inconvenience whatever, considering the small amplitude of the discontinuous displacements. As previously indicated, the synchronous motor is preferably of the automatic starting type, but it is not provided with any device for determining the direction of its rotation, which can take place in any direction.

What I claim as my invention and desire to secure by Letters Patent is:

1. In a clock, in combination two transparent plates, one of which constitutes the dial, an intermediate transparent plate arranged between the first two plates, a support fixed on one of the said plates for centrally supporting the intermediate plate, two indicating hands mounted coaxially to the support, means for operatively connecting the said hands, a synchronous motor, with a rotor rotating with a continuous movement, an oscillating lever pivoted at a fixed point and having one end engaging with the intermediate plate, a crank for imparting to the said lever and the intermediate plate rocking movements, means for operatively connecting the said crank to the rotor of the motor and means for connecting the indicating hands with the intermediate plate.

2. In a clock, in combination two transparent plates, one of which constitutes the dial, an intermediate transparent plate arranged between the first two plates, a support fixed on one of said plates for centrally supporting the intermediate plate, an arbor carried by said support, an indicating hand fixed on said arbor, a hub rotatably mounted on said arbor, another indicating hand carried by said hub, gearing connecting said arbor and said hub, a pawl carried by said intermediate plate, a ratchet engaging with said pawl and rotatably mounted coaxially to the indicating hands with which it is connected, an oscillating lever pivoted at a fixed point and having one end engaging with the intermediate plate, a crank disk, a trunnion mounted thereon and engaging with the other end of said lever and means connecting said disk with the rotor of the synchronous motor.

3. In a clock, in combination two transparent plates, one of which constitutes the dial, an intermediate transparent plate arranged between the first two plates, a central hub on the said intermediate plate, a support fixed on one of the first plates for supporting said hub, an arbor mounted coaxially to the said support and carrying at one end an indicating hand, teeth on said arbor, a second hub fixedly mounted on said arbor, a spring interposed between said support and a shoulder of said arbor for pressing said second hub against said support, a pawl journalled on the hub of the intermediate plate, a ratchet engaging said pawl, a third hub having teeth, a second indicating hand mounted thereon, gearing for connecting the latter teeth with the teeth of the arbor, a frame for supporting the two transparent plates, a synchronous motor with a rotor rotating with a continuous movement, an oscillating lever pivoted at a fixed point and having one end engaging with the intermediate plate, a crank disk, a trunnion mounted thereon and engaging with the other end of said lever and means connecting said disk with the rotor of the synchronous motor.

CHARLES HILAIRE HENRI RODANET.